United States Patent Office 3,448,128
Patented June 3, 1969

3,448,128
PREPARATION OF METAL SALTS OF AMPHOTERIC SURFACE ACTIVE AGENT
Hideo Marumo, Tokyo, and Minoru Saitoh, Saitama-ken, Japan, assignors to Lion Fat & Oil Co., Ltd., Tokyo, Japan, a corporation of Japan
No Drawing. Filed Nov. 28, 1966, Ser. No. 597,230
Int. Cl. C07f 1/02, 1/06, 1/04
U.S. Cl. 260—429                              7 Claims

ABSTRACT OF THE DISCLOSURE

A method for preparing a non-alkali metal salt of a betaine-type amphoteric surface active agent containing polyoxyethylene radicals, in which an alkali metal salt of the surface active agent is dissolved in an organic solvent which is capable of forming an azeotropic mixture with water, an aqueous solution of a non-alkali metal salt is added to the first solution, then the resulting mixture is heated to the azeotropic boiling temperature to distill water and the solvent from the mixture, following which the solvent is separated from the water and is recycled to the reaction mixture whereby the non-alkali metal salt of the surface active agent is formed.

---

The present invention relates to a method for synthesizing metal salts of carboxylic acid type amphoteric surface active agent containing polyoxyethylene radicals, and more particularly to a method of synthesizing non-alkali metal salts of betaine type amphoteric surface active agents containing polyoxyethylene radicals as neutral salts having high purity.

Non-alkali metal salts of carboxylic acid in general has been obtained as a result of double decomposition in water between an alkali metal salt of carboxylic acid and an inorganic non-alkali metal salt. For example, when an aqueous solution of calcium chloride is mixed in an aqueous solution of sodium stearate at a temperature ranging from 90 to 100° C. while being stirred, a reaction product is caused to float on the surface of the reacting solution. By separating this reaction product from the reacting solutioin by a known technique such as filtering, and by washing the separated product with water to remove the unreacted calcium chloride and sodium chloride formed as a byproduct, and further by drying the remaining product, calcium stearate is obtained. It has been confirmed by the inventors that the non-alkali metal salts of carboxylic acid type amphoteric surface active agentes also can be prepared by the use of the aforesaid double decomposition depending on the type of the amphoteric surface active agent used. However, in view of the equilibrium state which is present in the double decomposition in case an aqueous solution is used, the prior method for preparing non-alkali metal salts of amphoteric surface active agents by the use of the technique of effecting double decomposition in an aqueous solution had disadvantages that not only the reaction did not proceed sufficiently but also it resulted in a very poor yield of the final product. Also, in case double decomposition in an aqueous solution is utilized, the resulting non-alkali metal salt of the amphoteric surface active agent is obtained mostly in the form of an acidic salt with only a very few exceptions. Especially in case an alkali metal salt of a betaine type amphoteric surface active agent containing polyoxyethylene radicals is used as the starting material, the amount of the combining non-alkali metal is quite small, with the result that a product having a remarkably high acidity is obtained. Such product having a high acidity lacks stability to heat. Furthermore, the employment of the technique of double decomposition effected in an aqueous solution is accompanied by a difficulty in the step of separating the product from the reacting solution, the step of removing the unreacted non-alkali metal salt and also inorganic alkali metal salt which is formed as a byproduct and also in the step of drying the obtained product, and makes the entire process a complicated one. In addition, due to a great deal of difficulty encountered in the complete removal of the water contained in the product, it is not desired to use the non-alkali metal salts of the amphoteric surface active agents obtained by double decomposition in an aqueous solution as an additive for material where the presence of water is to be avoided such, for example, as in lubricants or anti-rust oils.

The present invention has been developed in order to solve the problems as described above which are encountered in the preparation of non-alkali metal salts of amphoteric surface active agents by double decomposition in aqueous solutions. The present invention is characterized by the fact that it employs, as the solvent in the reaction, organic solvents which make an azeotropic mixture with water but which do not dissolve in water.

According to the present invention, there is provided a method for preparing a non-alkali metal salt of a betaine amphoteric surface active agent containing polyoxyethylene radicals, comprising the steps of: dissolving an alkali metal salt of a betaine amphoteric surface active agent in an organic solvent which takes an azeotropic mixture with water but which does not dissolve in water; adding an aqueous solution containing a non-alkali metal salt into said solution; heating the resulting mixture up to the boiling point of the reaction mixture while stirring it; separating the water from the organic solvent which are distilled out together; recycling only the separated organic solvent to the reaction mixture, thereby effecting double decomposition between the alkali metal salt of the amphoteric surface active agent and the inorganic non-alkali metal salt. In short, by thus thoroughly removing the water contained in the reaction mixture, the double decomposition is completed.

The alkali metal salts of the amphoteric surface active agent which can be used in the present invention include the lithium salt, sodium salt, potassium salt and ammonium salt of betaine type amphoteric surface active agents. As the salt of the metal, there can be used water-soluble inorganic salts such as chlorides, sulfates, nitrates of various non-alkali metals such as magnesium, calcium, zinc, barium, aluminum, iron, nickel, manganese, and cadmium, and also water-soluble organic salts such as the formate and acetate. As the reacting solvent for use in the present invention, there are benzene, toluene, o-, m- and p-xylene, ethylbenzene, isopropylbenzene, cyclohexane, n - octane, methylisobutylketone, n - butylether, ethyl n-butylether, n-butylchloride, ethylenechloride, chloroform, carbon tetrachloride, 1,1,2-trichloroethane, and trichloroethylene which make an azeotropic mixture with water but which do not dissolve in water. Among these solvents, the preferred type comprises those which are of a specific gravity lower than that of water because they simplify the arrangement of the reaction apparatus, and those having a greater water content ratio in the azeotrope because they improve the reaction efficiency, and those having a low boiling point because they facilitate separation of the product and recovery. As the solvents which satisfy all these desired characteristics, benzene, toluene and xylene, for example, are preferred.

According to the present invention, the water which is present in the reaction mixture is discharged outside the mixture, as a result of the azeotropic phenomenon, when the organic solvent of the present invention is used. The organic solvent is recycled to the reaction mixture, and as a consequence, equilibrium can always be shifted toward the desired product, whereby the reaction rate can be increased. In addition, in view of the fact that the inorganic or organic salt of the alkali metal, which is a by-product, or the inorganic or organic salt of the unreacted non-alkali metal are all insoluble in the organic solvent of the present invention, the solvent facilitates separation of these salts from the reaction product, and these salts can be almost completely separated by simply filtering the reaction mixture so that the presence of impurities into the reaction product can be effectively minimized. Thus the reaction product is obtained in the form of a solution containing an organic solvent. However, the organic solvent can be easily separated and recovered by distillation. Furthermore, according to the present invention, almost all the water contained in the reaction product can be removed by continuing the reaction until the distillant water at the time of reaction becomes undetectable, and what is more, the non-alkali metal salt of the amphoteric surface active agent which is the final product is never converted to an acid salt by hydrolysis, and therefore, the resulting final product can be obtained as an anhydrous neutral salt which has an excellent stability to heat.

As such, the non-alkali metal salts of amphoteric surface active agents obtained according to the present invention have a wide utility as, for example, an antistatic agent, an additive for lubricants, an additive for machine oils, an oil-soluble anti-corrosion-rust agent, an additive for anti-rust agents and a modifying agent for high molecular materials, and above all, they are quite effective when used as a permanent antistatic agent for synthetic resins and fibers.

The present invention will now be described more concretely by referring to an example of the present invention. It is, however, to be understood that the scope of the present invention is not restricted thereto.

EXAMPLE

An alkali metal salt of polyoxyethylene alkylbetaine of one of the undermentioned three types was packed in a reaction vessel, subsequently an organic solvent was added thereto to dissolve said salt in said solvent. To this solution was added an aqueous solution of an inorganic salt (refer to numbers from 1 to 18 in the following table) of a non-alkali metal or an aqueous solution of an organic salt (refer to numbers 19 and 20 in the same table) of such metal and the resulting mixture was heated, while stirring, to cause boiling. The solvent collected by distillation in the form of an azeotropic mixture was cooled and then the water was separated and removed therefrom, so that the organic solvent alone was recycled to the reaction mixture. When the reaction has proceeded until it was noted that there was no water present in the distillate solvent, the heating was suspended and the reacted mixture was cooled. The mixture was then filtered through a filtering paper under a reduced pressure to remove the by-product alkali metal salts and the unreacted non-alkali metal salt. The filtered liquid was then subjected to distillation under a reduced pressure to remove the organic solvent, and a reaction product was obtained. The type and the amount of the alkali metal salt of the polyoxyethylene alkylbetaine used, the organic solvent and the non-alkali metal salt, as well as the yield of the reaction product and the result of analysis are shown in the following table. In the analysis, the metal content was determined by gravimetric analysis and by chelatometry while the nitrogen content was determined by Kjeldahl method.

The types of alkalimetal salt of polyoxyethylene alkylbetaine are as follows:

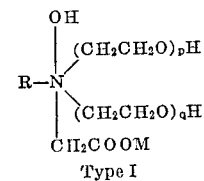

Type I

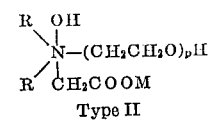

Type II

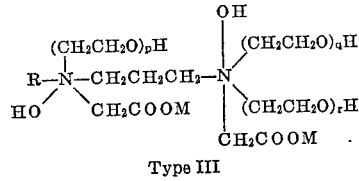

Type III

| | Betaine alkali metal salts | | | | Solvents (g.) | Non-alkali metal salts (g.) | Water (g.) | Yields | | Metal cont. (percent) | | N cont. (percent) | |
|---|---|---|---|---|---|---|---|---|---|---|---|---|---|
| No. | Type | R | P+q+r | M | G. | | | | G. | Percent | Obs. | Calc. | Obs. | Calc. |
| 1 | I | $C_{12}H_{25}$ | 2 | Na | 372 | Benzene, 372 | $CaCl_2 \cdot 2H_2O$, 81 | 123 | 361 | 98.0 | 5.50 | 5.44 | 3.77 | 3.80 |
| 2 | I | $C_{18}H_{37}$ | 10 | Na | 404 | Benzene, 404 | $ZnSO_4 \cdot 7H_2O$, 108 | 94 | 397 | 97.1 | 4.02 | 4.00 | 1.69 | 1.71 |
| 3 | I | ...do | 2 | Na | 456 | Toluene, 456 | $CaCl_2 \cdot 2H_2O$, 81 | 123 | 448 | 98.9 | 4.42 | 4.43 | 3.07 | 3.09 |
| 4 | I | $C_{12}H_{25}$ | 8 | Na | 412 | Toluene, 412 | $MgSO_4 \cdot 7H_2O$, 90 | 57 | 393 | 97.0 | 1.98 | 2.00 | 2.30 | 2.31 |
| 5 | I | $C_{18}H_{37}$ | 30 | Na | 563 | Xylene, 563 | $MnCl_2 \cdot 4H_2O$, 36 | 40 | 558 | 98.8 | 1.65 | 1.62 | 0.822 | 0.827 |
| 6 | I | $C_{12}H_{25}$ | 4 | Na | 460 | Cyclohexane, 460 | $BaCl_2 \cdot 2H_2O$, 134 | 323 | 490 | 96.9 | 13.7 | 13.6 | 2.76 | 2.77 |
| 7 | I | $C_{18}H_{37}$ | 50 | Na | 514 | Isopropyl benzene, 1,200. | $NiCl_2 \cdot 6H_2O$, 25 | 20 | 510 | 99.0 | 1.16 | 1.14 | 0.540 | 0.544 |
| 8 | III | $C_{12}H_{25}$ | 3 | K | 200 | Ethyl benzene, 470 | $CdSO_4 \cdot 8/3H_2O$, 128 | 218 | 200 | 94.7 | 17.2 | 17.6 | 4.37 | 4.40 |
| 9 | I | $C_{18}H_{37}$ | 4 | K | 140 | n-Octane, 560 | $MgSO_4 \cdot 7H_2O$, 34 | 22 | 130 | 97.5 | 2.25 | 2.28 | 2.65 | 2.63 |
| 10 | III | ...do | 15 | K | 600 | Methyl isobutyl ketone, 1,200. | $SnBr_2$, 151 | 352 | 590 | 95.2 | 9.32 | 9.45 | 2.20 | 2.23 |
| 11 | I | ...do | 60 | K | 303 | n-Butyl ether, 908 | $SrCl_2 \cdot 6H_2O$, 15 | 15 | 285 | 94.0 | 1.45 | 1.45 | 0.461 | 0.462 |
| 12 | II | $C_{12}H_{25}$ | 10 | K | 250 | Ethyl n-butyl ether, 583. | $CrCl_2$, 37 | 86 | 240 | 97.4 | 2.88 | 2.90 | 1.57 | 1.56 |
| 13 | II | $C_{18}H_{37}$ | 10 | Na | 318 | n-Butyl chloride, 742. | $Al(NO_3)_3 \cdot 9H_2O$, 40 | 35 | 305 | 97.1 | 0.850 | 0.859 | 1.36 | 1.34 |
| 14 | II | ...do | 30 | K | 200 | Ethylene chloride, 800. | $FeCl_2$, 15 | 35 | 194 | 96.8 | 1.44 | 1.42 | 0.710 | 0.714 |
| 15 | I | $C_{18}H_{35}$ | 2 | Na | 227 | Propylene chloride, 530. | $BaCl_2 \cdot 2H_2O$, 67 | 162 | 244 | 97.6 | 13.5 | 13.8 | 2.78 | 2.80 |
| 16 | II | ...do | 20 | Na | 150 | Carbon tetrachloride, 600. | $NiCl_2 \cdot 6H_2O$, 13 | 11 | 145 | 96.3 | 1.96 | 1.95 | 0.927 | 0.932 |
| 17 | III | $C_{18}H_{37}$ | 3 | Na | 300 | 1,1,2-trichloroethane, 1,200. | $MnCl_2 \cdot 4H_2O$, 100 | 112 | 292 | 96.0 | 8.20 | 8.27 | 4.24 | 4.22 |
| 18 | III | $C_{18}H_{35}$ | 15 | Na | 200 | Trichloroethylene, 800. | $ZnSO_4 \cdot 7H_2O$, 73 | 91 | 192 | 94.4 | 5.38 | 5.44 | 2.32 | 2.33 |
| 19 | I | $C_{12}H_{25}$ | 20 | Na | 433 | Cyclohexane, 433 | $Pb(CH_3COO)_2$, 36 | 143 | 438 | 97.6 | 4.58 | 4.61 | 0.625 | 0.624 |
| 20 | I | ...do | 6 | Na | 548 | Ethylbenzene, 548 | $Cu(CH_3COO)_2 \cdot H_2O$, 150. | 531 | 536 | 96.3 | 5.65 | 5.71 | 2.55 | 2.52 |

What is claimed is:

1. A method of preparing a non-alkali metal salt of a betaine type amphoteric surface active agent containing polyoxyethylene radicals, comprising the steps of: dissolving an alkali metal salt of a betaine type amphoteric surface active agent containing polyoxyethylene radicals in an organic solvent to form a first solution, the solvent being capable of forming an azeotropic mixture with water but being insoluble in water; adding an aqueous solution of a non-alkali metal salt to said first solution; heating the resulting mixture to the azeotropic boiling temperature of said solvent while stirring; separating the water contained in the distillate from the solvent outside the reaction mixture, and recycling the organic solvent alone to said reaction mixture so as to participate in the reaction; and separating the by-product alkali metal salt, the unreacted non-alkali metal salt and the solvent from the reaction product after completion of the reaction.

2. A method according to claim 1, in which said organic solvent is an aromatic hydrocarbon selected from the group consisting of benzene, toluene, xylene, ethylbenzene, and isopropylbenzene.

3. A method according to claim 1, in which said organic solvent is an aliphatic or alicyclic hydrocarbon selected from the group consisting of n-octane and cyclohexane.

4. A method according to claim 1, in which said organic solvent is a ketone selected from the group consisting of methylisobutyl ketone and ethyl n-butyl ketone.

5. A method according to claim 1, wherein said organic solvent is an ether selected from the group consisting of n-butylether and ethyl n-butylether.

6. A method according to claim 1, in which said organic solvent is a halogenated hydrocarbon selected from the group consisting of carbon tetrachloride, chloroform, ethylenechloride, 1,1,2-trichloroethane, trichloroethylene, propylene chloride and n-butyl chloride.

7. A method according to claim 1, in which said alkali metal salt of the betaine type amphoteric surface active agent containing polyoxyethylene radicals is selected from the group consisting of a lithium salt, a sodium salt, a potassium salt and an ammonium salt.

References Cited

Kirk-Othmer: Encyclopedia of Chemical Technology 2nd ed., Interscience Publishers, New York (1963), vol. 2, pp. 856–9.

TOBIAS E. LEVOW, *Primary Examiner.*

A. P. DEMERS, *Assistant Examiner.*

U.S. Cl. X.R.

117—139.5; 252—8.6, 33.6, 389, 392, 396; 260—429.3, 429.5, 429.7, 429.9, 430, 431, 435, 438.1, 438.5, 439, 448, 501